United States Patent [19]

Matsuoka

[11] Patent Number: 4,994,933
[45] Date of Patent: Feb. 19, 1991

[54] GROUND FAULT CIRCUIT INTERRUPTER HAVING LOSS OF NEUTRAL OR LOSS OF GROUND PROTECTION

[75] Inventor: Joseph M. Matsuoka, Lincoln, Nebr.

[73] Assignee: Square D Company, Palatine, Ill.

[21] Appl. No.: 340,303

[22] Filed: Apr. 19, 1989

[51] Int. Cl.$^5$ .............................................. H02H 3/24
[52] U.S. Cl. ........................................ 361/42; 361/45; 361/92
[58] Field of Search ........................ 361/42, 45, 47, 50, 361/86, 88, 92

[56] References Cited

U.S. PATENT DOCUMENTS

| | | | |
|---|---|---|---|
| 4,068,276 | 1/1978 | Pintell | 361/46 |
| 4,598,331 | 7/1986 | Legatti | 361/46 |
| 4,816,957 | 3/1989 | Irwin | 361/45 |

FOREIGN PATENT DOCUMENTS

| | | |
|---|---|---|
| 0154450 | 9/1985 | European Pat. Off. . |
| 2000398 | 1/1979 | United Kingdom . |
| 2162708 | 2/1986 | United Kingdom . |

*Primary Examiner*—Derek S. Jennings
*Attorney, Agent, or Firm*—Larry I. Golden; Jose W. Jimenez; A. Sidney Johnston

[57] ABSTRACT

A ground fault circuit interrupter is described which provides protection in the event of loss of neutral or ground, excess potential between neutral and ground and reversed input connections. Separate, independent tripping circuits are used for these latter faults and for ground faults, thus eliminating problems due to interfering signals and reducing reliance on any one component or group of components. An opto-emitter and opto-detector arrangement is used for detecting and causing tripping of a circuit breaker in the event of faults other than ground faults.

4 Claims, 1 Drawing Sheet

4,994,933

GROUND FAULT CIRCUIT INTERRUPTER HAVING LOSS OF NEUTRAL OR LOSS OF GROUND PROTECTION

FIELD OF THE INVENTION

The present invention relates to a ground fault circuit interrupter which provides protection against ground faults, loss of neutral, loss of ground, reversal of input connections and excess potential between neutral and ground.

BACKGROUND OF THE INVENTION

It is known to provide a ground fault circuit interrupter which will open a power or line lead in an electrical system in response to detection of a ground fault. Such circuits are generally quite effective at providing protection in situations such as when a person touches a line lead in equipment or at a socket.

There are, however, many other fault situations which can occur. Two such faults are loss of neutral and loss of ground, which phrases refer to an opening of the neutral or ground leads. Other faults which may occur are that potential may arise between the neutral and ground leads and also reversal of connections, where, for example the line voltage may appear at the neutral lead. All of these faults are indicated by excessive potential arising between neutral and ground and thus, for simplicity they are referred to hereinafter as "loss of neutral or ground".

In an attempt to overcome some of these problems, ground fault circuit interrupters which incorporate loss of neutral protection have been devised. One example is that described in U.S. Pat. No. 4,598,331 (Legatti). In the conventional manner, this circuit includes a differential transformer having opposed primary windings and a secondary winding which is energized when there is an imbalance between the line and neutral leads. When the secondary winding is energized a tripping circuit energizes a circuit breaker to open the line lead. In addition, the neutral and ground leads are interconnected by a supplemental winding on the differential transformer. Power connections between the line lead and both the neutral and ground leads supply a current which passes through the supplemental winding in the event of loss of neutral or ground. On loss of neutral or ground the secondary winding energizes and thereby energizes the circuit breaker to open the line lead.

While it appears that this circuit would be quite effective in most situations, we envisage problems arising in operation under certain circumstances. One problem is that while ground faults and loss of neutral or ground are detected separately, the tripping circuits which are controlled by the detection circuits are intrinsically tied together. For example, the secondary winding is energized both on detection of a ground fault, and also on detection of a loss of neutral or ground. Accordingly, these two different inputs may interfere to prevent corrective action being taken in the case of one or more faults. An extreme example of this is if a ground fault and loss of neutral occur simultaneously, the induced magnetic fields of the differential transformer may cancel, thereby failing to energize the circuit breaker. Secondly, it is clear that if a fault were to occur in the differential transformer itself, then there would be no protection for any of the faults.

SUMMARY OF THE INVENTION

According to the invention there is provided a ground fault circuit interrupter for use in a system having line, neutral and ground leads between an energy source and a load comprising; a circuit breaker arranged to open the line lead in response to a trip signal, a ground fault detection circuit for detection of a ground fault in the system, and a ground fault tripping circuit operatively connected to the ground fault detection circuit to provide a circuit breaker trip signal in response to detection of a ground fault. The interrupter further comprises a loss of neutral or ground detection circuit for detection of loss of neutral or loss of ground in the system, the detection circuit comprising means for detecting a potential between the neutral and ground leads, said potential being indicative of loss of neutral or loss of ground; and a loss of neutral or ground tripping circuit operatively connected to the loss of neutral or ground detection circuit for providing a circuit breaker trip signal in response to detection of loss of neutral or loss of ground, the circuit being separate from the ground fault tripping circuit.

OBJECTS OF THE INVENTION

It is an object of the present invention to provide a ground fault circuit interrupter which protects against ground faults, loss of neutral, loss of ground, excessive potential between the neutral and ground leads and reversal of connections in which the tripping circuits for these faults are not all dependent on one component or a group of components.

Another object is to provide a ground fault circuit interrupter which is reliable in operation and which is also inexpensive to manufacture.

These and other features, advantages and objects of the invention will be more clearly understood from the following description of an embodiment thereof given by way of example only with reference to the accompanying drawing.

DETAILED DESCRIPTION OF THE PREFERRED EMBODIMENT

Figure 1:
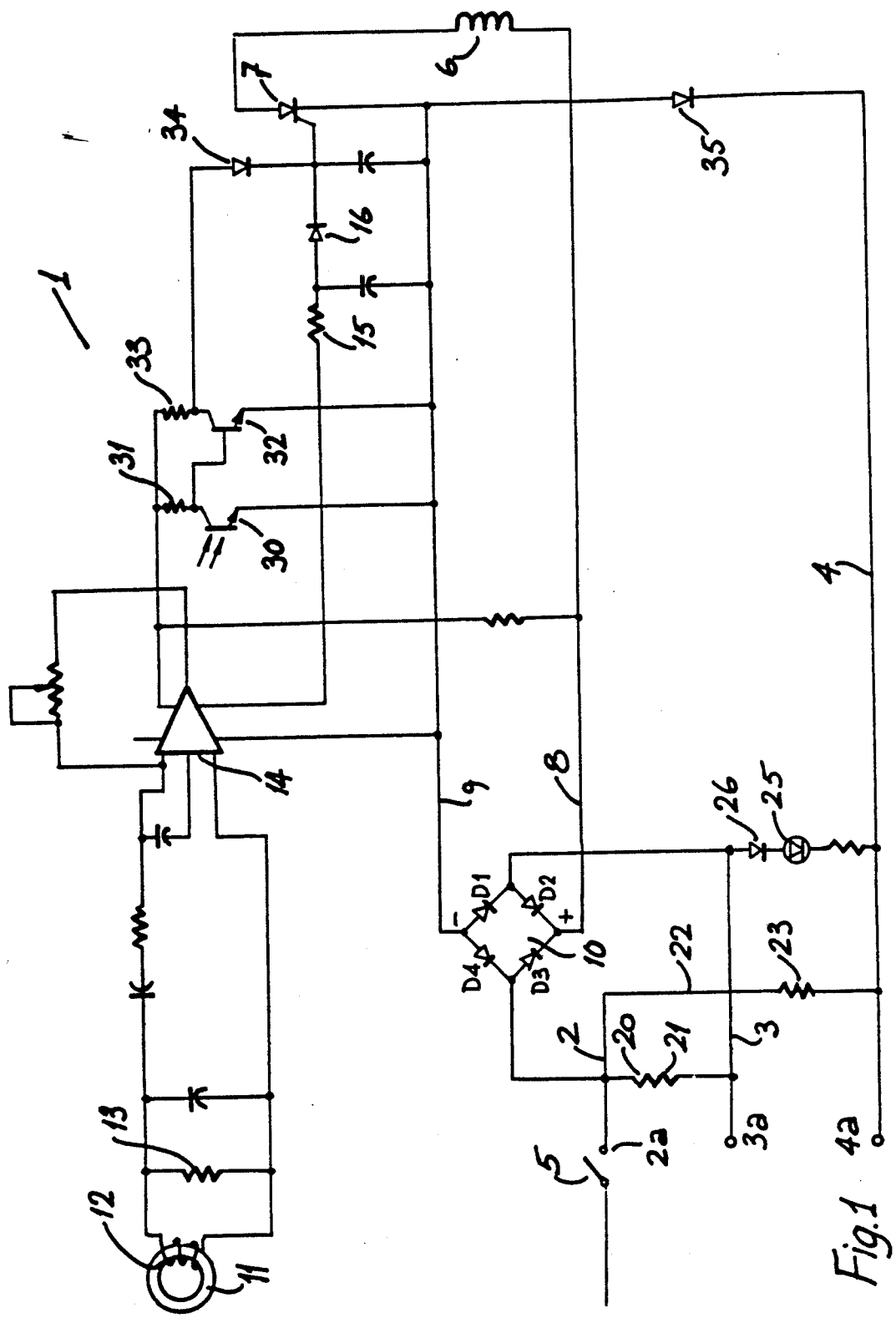
FIG. 1, is a circuit diagram of a ground fault circuit interrupter according to the invention.

Referring to FIG. 1 there is illustrated a ground fault circuit interrupter according to the invention indicated generally by the reference numeral 1. The ground fault circuit interrupter 1 is in a system having a line lead 2, a neutral lead 3, and a ground lead 4, which leads are connected at terminals 2a, 3a and 4a, respectively. The circuit interrupter 1 comprises a circuit breaker formed by a switch 5 at the line lead terminal 2a controlled by a solenoid 6 and an associated SCR 7. The solenoid 6 and SCR 7 are connected in series across the positive and negative output terminals 8 and 9 respectively of a bridge rectifier 10 comprising diodes D1 to D4, the input of the rectifier being connected to the line and neutral leads 2 and 3, respectively.

A ground fault detection circuit is provided by a differential transformer 11 in which the line and neutral leads form a pair of opposed primary windings (not shown). A secondary winding 12 which is energized when there is a current imbalance in the line and neutral leads completes the ground fault detection circuit.

A ground fault tripping circuit is provided by a burden resistor 13 in parallel with the secondary winding 12. The voltage across the winding 12 appears at the input of an amplifier 14 and the output of the amplifier 14 is connected to the gate of the SCR 7 by a resistor 15 and a diode 16.

Power for the operation of a loss of neutral or ground detection circuit is provided via a lead 20 and a resistor 21 between the line and neutral leads and a lead 22 and a resistor 23 between the line and ground leads. The loss of neutral or ground detection circuit is completed by a light emitter, in this embodiment an opto-emitter 25 in series with a diode 26 and a resistor 27, connected between the neutral and ground leads.

A loss of neutral or ground tripping circuit is provided by a light detector, in this case an opto-detector 30, connected at its collector to the positive rectifier output through a current limiting resistor 31. The collector of the opto-detector 30 is also connected to the base of a triggering transistor 32 having a current limiting resistor 33 at the collector. The collector of the triggering transistor 32 is also connected to the gate of the SCR 7 through a forward blocking diode 34.

The circuit interrupter 1 is completed by a diode 35 connected between the negative output terminal 9 and the ground lead 4.

In the event of a ground fault during operation, there will be an imbalance between the line and neutral leads which will result in an induced current flow in the secondary winding 12 of the differential transformer 11. This current flow will appear as a voltage signal at the input of the amplifier 14 which, in turn, transmits a trip signal to the gate of the SCR 7 of the circuit breaker.

Under normal conditions, no significant potential exists between the neutral and ground leads 3 and 4 and the opto-emitter 25 is not activated. If, however, the ground lead 4 opens a current path is produced upon the negative half cycle from the neutral lead 3 through the diode 26, the opto-emitter 25 and finally through the resistors 27 and 23 to the line lead 2. This current energizes the opto-emitter 25 which, in turn, energizes the opto-detector 30 of the loss of neutral tripping circuit.

If the neutral lead opens, a current path is produced on the positive half cycle from the line lead 2 though the resistor 21, the diode 26, the opto-emitter 25 and the resistor 27 to the ground lead 4. This current activates the opto-emitter 25, which in turn, energizes the opto-detector 30 of the loss of neutral tripping circuit.

If the line lead 2 is accidentally connected to the ground terminal, with the neutral connected properly, a current path will be produced on the negative half cycle from the neutral lead 3 through the diode 26, the opto-emitter 25, and the resistor 27 to the ground lead 4. Again, this current activates the opto-emitter 25.

If an excessive potential arises between the neutral and ground leads, the diode 26 will conduct, again causing the opto-emitter 25 to be activated In normal operation, the opto-detector 30 is turned off and the collector's high impedance maintains the triggering transistor 32 in the ON state, thus creating a low collector to emitter voltage.

When a loss of neutral or ground occurs the opto-detector 30 receives an optically induced signal above the threshold level. The majority of the current flowing through the current limiting resistor 31 then flows through the opto-detector 30 to the negative lead 9 of the bridge rectifier 10. This allows a sufficiently low voltage to appear at the collector and thus the triggering transistor 32 is turned off. In this case, the majority of the current flowing through the current limiting resistor 33 flows through the forward blocking diode 34 to the gate of the SCR 7, thereby energizing the circuit breaker.

In the event of a ground fault only, when the SCR 7 is tripped a current path is produced from the positive rectifier output lead 8, through the solenoid 6 and the SCR 7. The current is then divided between the rectifier diode D1 of the bridge rectifier 10 to the neutral lead 3 and the diode 35 to ground. If the circuit breaker is operated, however, in response to loss of neutral or ground, the energizing circuit is completed by the diode 35 to ground. The diode 35 also ensures continued rectification in the event of loss of neutral, with the rectifier input being formed by the line and ground leads.

It will be appreciated that by using separate, independent tripping circuits, the possibility of tripping signals interfering to cause faulty operation is avoided. Further, the effects of damage to one or the other tripping circuit are minimized. For example, protection in the event of loss of neutral or ground, excess potential between neutral and ground and reversed input connections will continue even if the differential transformer 11 is damaged. Further, it has been found that the opto-emitter/detector arrangement is not only extremely reliable, but also inexpensive as few components are required.

Various changes and modifications may be made to the arrangement described without departing from the scope of the invention. For example, it is envisaged that the opto-detector 30, the triggering transistor 32 and the associated resistors 31 and 33 may be dispensed with by the use of an opto-SCR in the circuit breaker. It is also envisaged that the circuit breaker may be arranged to also open the neutral lead. This would prevent accidents in the event of excessive neutral potential.

What is claimed is:

1. A ground fault circuit interrupter for use in a system having line, neutral and ground leads between an energy source and a load, said circuit interrupter comprising:
    a circuit breaker arranged to open the line lead in response to a trip signal;
    a ground fault detection circuit for detection of a ground fault in the system;
    a ground fault tripping circuit operatively connected to the ground fault detection circuit to provide a circuit breaker trip signal in response to detection of a ground fault;
    a loss of neutral or ground detection circuit for detection of loss of neutral or loss of ground in the system, said detection circuit comprising means for detecting a potential between the neutral and ground leads, said potential being indicative of loss of neutral or loss of ground; and
    a loss of neutral or ground tripping circuit operatively connected to the loss of neutral or ground detection circuit by a nonelectrical signal transmission link for providing a circuit breaker trip signal in response to detection of loss of neutral or loss of ground, said loss of neutral or ground tripping circuit being separate from said ground fault tripping circuit.

2. The ground fault circuit interrupter as recited in claim 1 wherein said loss of neutral or ground detection circuit comprises light emitting means connected between the neutral and ground leads for emission of a light signal when a pre-determined potential between the neutral and line leads is reached and in which the loss of neutral or ground tripping circuit comprises light sensing means for sensing of light emitted by the light emitting means to cause a trip signal to be transmitted to the circuit breaker.

3. The ground fault circuit interrupter as recited in claim 2 wherein said light emitting means comprises an opto-emitter connected in series with a rectifier, said rectifier determining the neutral to ground potential at which said opto-emitter is activated.

4. The ground fault circuit interrupter as recited in claim 1 wherein said ground fault detection circuit comprises a differential transformer having a pair of opposed primary windings, one connected to the line lead, the other to the neutral lead, and a secondary winding which conducts in the event of current imbalance in the line and neutral leads, said ground fault tripping circuit causing a trip signal to be transmitted to said circuit breaker in response to current flow in the secondary winding.

* * * * *